United States Patent [19]

Everest

[11] Patent Number: 4,907,895
[45] Date of Patent: Mar. 13, 1990

[54] OPTICAL CHOPPER FOR INFRARED THERMOMETER

[75] Inventor: Charles E. Everest, Santa Ana, Calif.

[73] Assignee: IVAC Corporation, San Diego, Calif.

[21] Appl. No.: 176,170

[22] Filed: Mar. 31, 1988

[51] Int. Cl.⁴ .............................. G01J 5/06; G01J 5/62
[52] U.S. Cl. ..................................... 374/130; 374/128; 356/43
[58] Field of Search ............... 374/130, 126, 128, 129, 374/132, 2; 356/43, 45

[56] References Cited

U.S. PATENT DOCUMENTS

| | | | |
|---|---|---|---|
| 2,978,589 | 4/1961 | Hewell | 374/129 |
| 3,227,877 | 1/1966 | Dreyfus | 374/130 |
| 3,272,013 | 9/1966 | Astheimer | 374/130 |
| 3,293,915 | 12/1966 | Banca et al. | 374/133 |
| 3,350,562 | 10/1967 | Flint | 374/126 |
| 3,392,282 | 7/1968 | Astheimer | 374/126 |
| 3,404,283 | 10/1968 | Stanfill et al. | 356/45 |
| 3,465,149 | 9/1969 | Flint | 250/83.3 |
| 3,482,448 | 12/1969 | Gaffard | 356/43 |
| 3,766,781 | 10/1973 | Roberts | 374/128 |
| 4,005,605 | 2/1977 | Michael | 73/355 R |
| 4,568,201 | 2/1986 | Noda | 374/128 |
| 4,602,642 | 7/1986 | O'Hara et al. | 128/664 |
| 4,634,294 | 1/1987 | Christol et al. | 374/130 |

FOREIGN PATENT DOCUMENTS

| | | | |
|---|---|---|---|
| 0026464 | 2/1980 | Japan | 374/126 |
| 86/06163 | 10/1986 | PCT Int'l Appl. | 364/557 |
| 2119925 | 11/1983 | United Kingdom | 374/128 |

OTHER PUBLICATIONS

Geist Jon, and Blevin, W. R., "Chopper-Stabilized Null Radiometer Based Upon an Electrically Calibrated Pyroelectric Detector", Applied Optics, vol. 12, No. 11, Nov. 1973, pp. 2532-2535.

Primary Examiner—William A. Cuchlinski, Jr.
Assistant Examiner—Thomas B. Will
Attorney, Agent, or Firm—Fulwider Patton Lee & Utecht

[57] ABSTRACT

The infrared thermometer optical chopper includes a planar shutter having infrared radiation transmissive and infrared reflective portions arranged on the shutter, and a mechanism for rotating the shutter sequentially through a series of stop positions in which the transmissive and reflective portions are sequentially aligned with the internal optics of the infrared thermometer. A mechanism is also preferably provided for sensing the positioning of the shutter at the stop positions, to determine whether the shutter stop position alignment is in an infrared radiation transmissive phase or in an infrared radiation reflective phase.

38 Claims, 3 Drawing Sheets

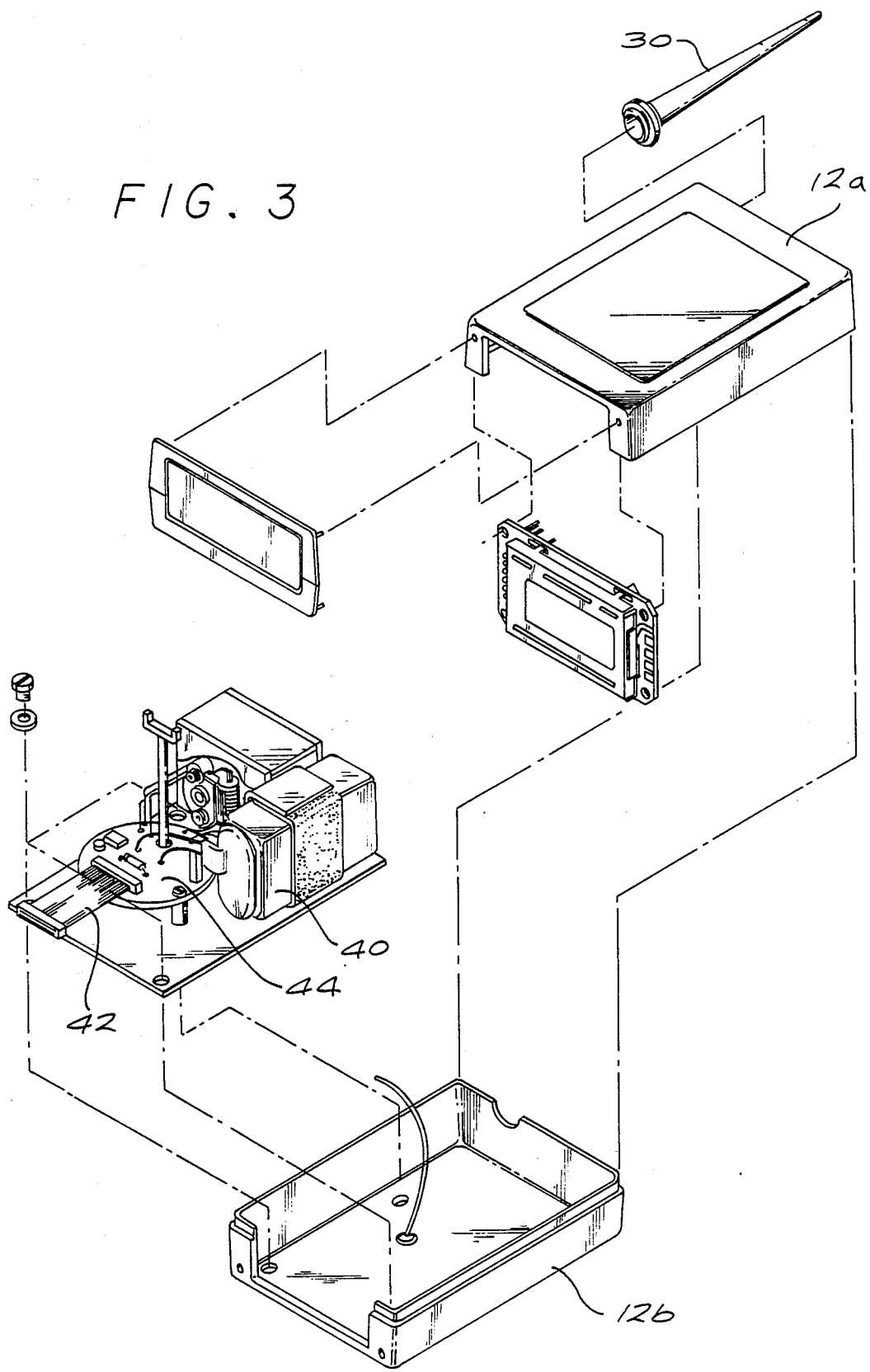

OPTICAL CHOPPER FOR INFRARED THERMOMETER

BACKGROUND OF THE INVENTION

1. Field of the Invention

This invention relates generally to infrared thermometers, and more particularly to an optical chopper system within an infrared thermometer. A particular use of the infrared thermometer having the optical chopper is in combination with an insertion probe for measuring body temperature in a clinical setting.

2. Prior Art

In the diagnosis and treatment of diseases, measurements of a patient's body temperature is conventionally performed by the use of mercury thermometers and electronic thermometers. Mercury thermometers have the disadvantages of requiring sterilization before each use, and require a period of time for obtaining a reasonably accurate temperature reading of generally at least a minute. Electronic thermometers are generally used with a disposable cover over the temperature probe, to avoid the necessity of sterilizing the electronic thermometer probe, but an accurate reading of body temperature generally requires at least 30 seconds, since the temperature of the sanitary sheath requires this minimum period of time to equilibrate to an patient's temperature.

Infrared thermometers have become useful recently in obtaining remote temperature readings. One such device is described in U.S. Pat. No. 4,005,605 (Michael), in which a remote reading infrared thermometer in a form of a hand held probe alternately senses radiation from an inner reference area and a target, through the same optical path. An internal mirror tilts to reflect the internal readings from a portion of the thermometer to reflect the internal infrared radiation to a sensor, for comparison with the signal from the target. Another hand held infrared thermometer probe is described in U.S. Pat. No. 4,602,642 (O'Hara et al.), in which an associated chopper unit is connected or connectable to the infrared probe for making calibrations of the instrument. A more comprehensive internal calibration is described for a thermal detection system in U.S. Pat. No. 3,465,149, where a spherical chopper unit, placed behind the collimating and focusing optics of the detector, rotates about an infrared sensor area to alternately allow infrared radiation to reach the sensor from a target and from reflections from a black body surface.

It would be desirable for an infrared thermometer to include a chopper for automatically calibrating the thermometer from as much of the internally radiated error signals as possible, rather than a limited portion of the detector or a separate chopper device. Ideally then, the error signals can be substracted from the infrared readings from a target to obtain a true reading for determination of temperature. It would also be desirable to provide such an automatically calibrating internal chopper system which would cycle through calibration and temperature measurement in predetermined optimum time periods, to provide a "snapshot" reading to minimize the effect of external thermal conditions and external radiation on internal error signals. It would also be desirable to place an optical chopper system as far forward of the internal optics of the infrared thermometer as possible, in order to insure that the error signals from as much as possible of the relevant portions of the instrument are taken into account.

SUMMARY OF THE INVENTION

The present invention provides an infrared thermometer apparatus having an optical chopper system including a planar shutter having infrared radiation transmissive and infrared reflective portions arranged on the shutter, and a mechanism for rotating the shutter sequentially through a series of stop positions in which the transmissive and reflective portions are sequentially aligned with the internal optics of the infrared thermometer.

Briefly and in general terms, the infrared thermometer apparatus of the invention includes an infrared sensor and optics in the thermometer for focusing infrared radiation on the sensor, and an optical chopper which comprises a planar shutter mounted for rotation through a plurality of stop positions externally of the optics of the instrument, the planar shutter having equally spaced apart infrared radiation transmissive and non-transmissive portions, the non-transmissive portions of the side of the shutter facing the internal optics of the thermometer having a reflective surface on at least a portion thereof; and means for rotating the shutter sequentially through the plurality of stop positions corresponding to each of the transmissive and non-transmissive portions, to a align the transmissive and non-transmissive portions at each stop position with the optics of the instrument, for either transmitting infrared radiation through the shutter, or reflecting internal infrared radiation from the shutter to the sensor.

In a preferred embodiment, the means for rotating the shutter includes a stepper motor connected to the shutter by a shaft, for rotating the shutter through the stop positions in response to a control signal. Means are also preferably provided for controlling the stepper motor, and means are also preferably provided for sensing the positioning of the shutter at the stop positions, to determine whether the shutter stop position alignment is in an infrared radiation transmissive phase or in an infrared radiation reflective phase.

The shutter itself also preferably has two sides which both are highly reflective of infrared radiation, and the infrared radiation transmissive portions and infrared radiation reflective surfaces are also preferably arranged as an odd number of each of the portions, with the reflective portions being directly across the axis of rotation from the transmissive portions. One preferred shape for the shutter is that of a round wheel.

Other aspects and advantages of the invention will become apparent from the following detailed description, and the accompanying drawings, illustrating by way of example the features of the invention.

BRIEF DESCRIPTION OF THE DRAWINGS

FIG. 3 is a perspective exploded view of the major parts of the infrared thermometer;

DETAILED DESCRIPTION OF THE INVENTION

Figure 1:
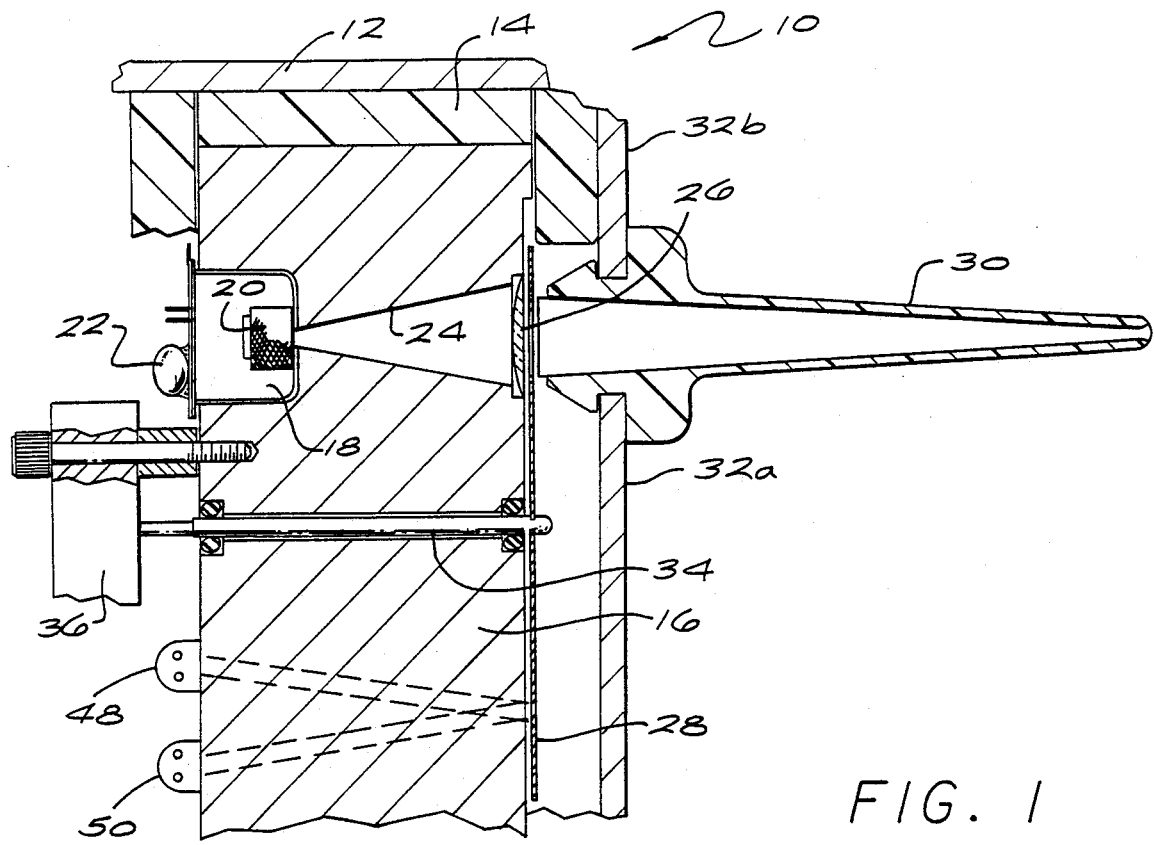
FIG. 1 is a partial cross-sectional elevational view of an infrared thermometer with an insertion probe attached.
Figure 2:
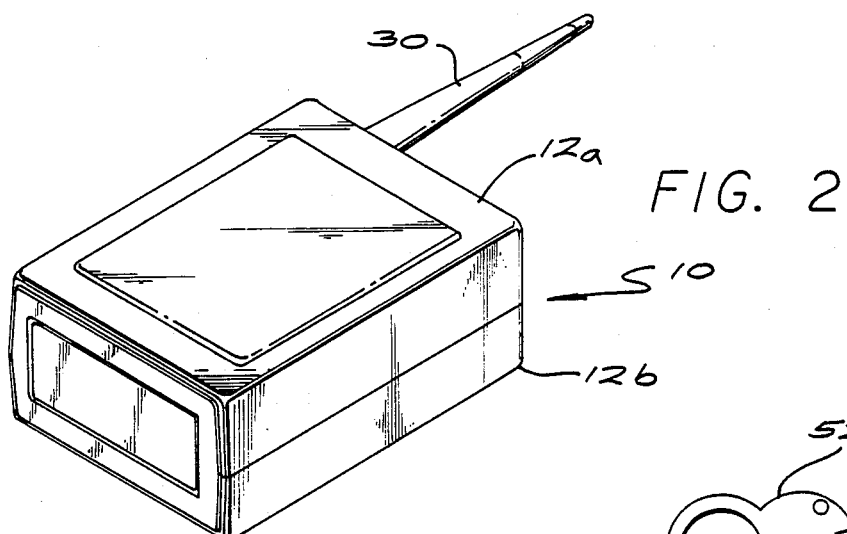
FIG. 2 is a perspective view of the exterior of the infrared thermometer.

As is shown in the drawings for purposes of illustration, the invention is embodied in an infrared thermometer apparatus having an infrared sensor and means in the thermometer for focusing infrared radiation on the sensor, and an optical chopper comprising a planar shutter having infrared radiation transmissive and reflective portions facing the sensor, and means for rotating the shutter through a plurality of stop positions in which the transmissive and reflective portions are aligned with the means for focusing the radiation on the sensor, so that infrared error signals generated internally in the thermometer can be measured and subtracted from infrared radiation received from a target, to provide a true temperature reading of the target.

In accordance with the invention, there is provided an infrared thermometer apparatus having an infrared sensor, means for focusing infrared radiation on the sensor, and an optical chopper comprising a planar shutter having an axis of rotation and mounted for rotational movement through a plurality of stop positions externally of the means for focusing, the shutter having a first side facing the means for focusing and a second side, the shutter having equally spaced apart infrared radiation transmissive and non-transmissive portions, the non-transmissive portions of the first side having a reflective surface on at least a portion thereof; and means for rotating the shutter sequentially through the plurality of stop positions corresponding to each of the transmissive and non-transmissive portions, such that each stop position is sequentially aligned with the means for focusing, for either transmitting infrared radiation through the shutter or reflecting internal infrared radiation from the shutter to the sensor.

As is shown in the drawings, the infrared thermometer 10 includes a housing 12, 12a, 12b, and thermally non-conductive insulation material 14 contained within the housing. The insulation may be made of conventional insulating materials, such as a closed cell plastic foam. Such closed cell plastic foams can be made of various types of plastics, but one preferred plastic material is polystyrene. The insulation surrounds a dense mass of material which serves as a heat sink 16 around the detector 18. The heat sink may for instance be composed of a metal, to provide stability of the internal temperature surrounding the detector area. A lighter weight metal, such as aluminum, is preferred. Within the detector block is the infrared sensor 20, preferably a thermopile, which may include a band pass interference filter to block all wave lengths shorter than seven microns and longer than twenty microns, allowing wave lengths between seven microns and twenty microns to pass to the sensor. A thermistor 22 is also provided in intimate contact with the detector, to provide accurate measurement of the temperature of the sensor, which is necessary in interpretating the infrared readings from the sensor as an indication of temperature from the target.

The infrared sensor 20 produces an output voltage which is proportional to the difference between its own case temperature and the temperature of the target. Since both of the temperatures are variables, it is necessary to know the exact temperature of the detector housing at all times to use as a reference to which the infrared derived differential temperature is added. The housing temperature is measured with the precision thermistor 22, which is cemented in intimate physical and thermal contact with the detector housing, using highly thermally conductive epoxy cement.

The thermopile infrared sensor is highly sensitive to transient thermal gradients within its own body. When exposed to these thermal transients, it will output extraneous error signals that cannot be distinguished from the desirable, useful signal. Therefore the optical chopper is used as a fast autozero means. In addition, a thermal filter is used between the ambient temperature transients and the detector element to slow down and smooth out the temperature change. The thermal filter consists of the high thermal mass or heat sink which is in intimate contact with the detector, which is in turn insulated from the outside enclosure with an extremely low thermal conductivity blanket made from material such as a closed cell plastic foam.

A positive cone channel lens 24 is placed in front of the sensor for directing infrared radiation focused by the condensor lens 26 to the sensor. The positive cone channel lens preferably has an inner surface which is highly reflective, and is preferably made of Mylar film, a product of Du Pont de Nemurs, E. I. and Company, which is essentially a polyester film having a highly reflective aluminized surface. Alternatively, the internal surface of the positive cone channel lens may be provided with a metallized reflective surface, such as by vapor deposition of a reflective metal on the inner surface of the cone channel lens. A further alternative reflective surface may be a dielectric coating. The positive condensor lens 26 is preferably a Fresnel lens affixed to the forward end of the positive cone channel lens by epoxy cement.

A planar shutter 28 is mounted for rotational movement about the axis of rotation 31 in front of and exterior to the Fresnel condensor lens. The infrared thermometer is also adapted to receive an insertion probe 30, having a highly reflective inner surface to pass substantially all of the infrared radiation received from a target through the insertion probe to the Fresnel condensor lens for focusing onto the sensor. The insertion probe functions in the manner as a collimating objective lens for the infrared thermometer. Jaws 32a and 32b are mounted for movement towards and away from the insertion probe for engaging the probe in an accurate position.

The Fresnel lens and other elements of the infrared thermometer within the sensor's field of view, behind the instrument end of the collimating insertion probe, have a certain amount of absorptivity, and therefore partially absorb incident radiation of all wavelengths, which causes minute and irregular heating or cooling of the elements. These elements then re-radiate infrared radiation as error signals to the sensor, which it does not distinguish from useful signals radiated from a target. The solution to this problem provided by the present invention is the placement of the optical chopper in front of all of the optical elements which would re-radiate infrared error signals, so that the incoming infrared radiation may be separated from the error signals generated within the instrument itself. The planar shutter 28 includes at least one transmissive portion 29, which is preferably an opening in the shutter, allowing infrared radiation to pass through the shutter, and at least one reflective portion 27 on the side of the shutter facing the sensor. In the preferred embodiment, the shutter has three openings and three reflective portions equally spaced about the rotational axis of the shutter. However, it is conceivable that other numbers and arrangements of transmissive and reflective portions would be workable. For example, an arrangement of five openings and five intervening reflective spaces, or one opening with one opposing reflective area would be possible. However, for accurate balancing and positioning of the phases of the shutter, preferably an odd number of openings with reflective portions directly across the rotational axis of the shutter should be provided.

The shutter, or optical chopper, therefore has two alternating stable stop positions, or phases, where it alternatively intercepts the detector field of view with mirror surface which reflects back all of the field of view onto the infrared sensor itself, and a second phase which opens the detector field of view with an open window which allows the detector a full unobstructed view of infrared radiation from the objective lens.

Given the following definitions, $E_d$ is the detector output voltage;

$E_de$ is the detector output voltage component due only to the sum of the error signals;

$E_ds$ is the detector output voltage component due only to the target temperature signal;

$E_d$-open is the detector output voltage with the shutter in an open position;

$E_d$-closed is the detector output voltage with the chopper in a closed position,;

$$E_d = E_de + E_ds.$$

The detector output voltage is equal to the sum of the error signals and the target temperature signal. Also, $$E_d\text{-open} = E_de + E_ds; \text{ and}$$
$$E_d\text{-closed} = E_de.$$

Storing the detector signal present when the chopper is closed, and algebraically subtracting this error signal from the total measured detector signal value when the chopper is open, gives the difference signal which is the desired true value from the target.

The shutter rotational center 25 is connected to a shaft 34 extending from a stepper motor 36, which in the preferred embodiment with the shutter having three holes and three reflective portions, steps through 60 degrees each time that it is pulsed by the control electronics, from one stop position to the next stop position. The control electronics preferably include a microprocessor, which will park the shutter in a closed position when the infrared thermometer is not in use, and a reading of the internally generated signal will be strobed into memory for a subtraction from a reading from the target later. When a reading is to be made, the stepper motor is pulsed to turn the shutter to an open phase for a reading of typically from 0.6 seconds to 0.8 seconds, and the reading is strobed into the memory of microprocessor, which subtracts the error signal from the target signal to provide a true signal for processing. The microprocessor preferably performs an analysis of the output from the sensor as a fifth order polynomial to calculate a temperature readout from the brief infrared measurement. It should be noted that the shutter is preferably made of Mylar, but may also be made of spring metal. The shutter preferably has highly reflective surfaces on both sides of the shutter, to avoid possible heating of the shutter due to absorption of infrared energy. It is also important that the shutter not be susceptible to vibrations, since oscillations of the shutter may affect the internal infrared error signal readings.

Figure 4:
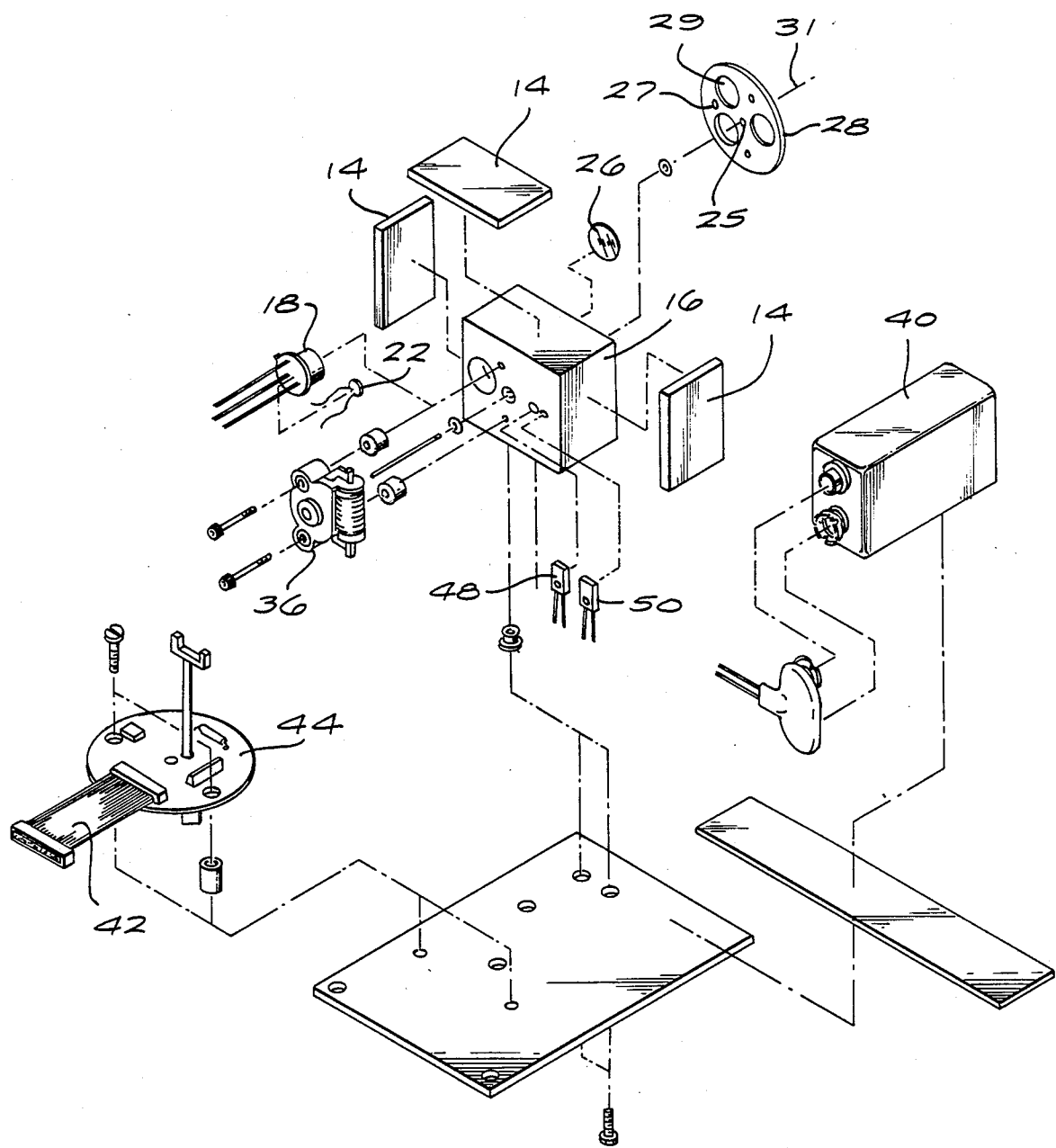
FIG. 4 is a partial exploded view showing interior parts of the infrared thermometer.

With reference to FIGS. 3 and 4, the infrared thermometer preferably also contains a display means 38, which is typically an LCD alphanumeric display. The display, processor, and stepper motor are all powered by a power source 40, which is preferably a nine volt lithium battery to allow for complete portability of the device. A cable 42 extendeds from the circuit board 44 to the display, and a microprocessor means, which is not shown, is preferably included in the circuit board 44.

Also provided in the preferred embodiment of the infrared thermometer is a means for sensing the stop position of the shutter, irrespective of actual control signals which may have been pulsed to the stepper motor. For this purpose, an LED light source 48 is provided facing the reflective side of the shutter, approximately across the shaft from the detector. A photodetector 50 is also provided in relatively close proximity to the LED light source for receiving light emitted by the light source and reflected from the the reflective portion of the shutter, when the shutter is in a open phase or stop position. When the shutter is in a closed position, the light from the light source will not be reflected back to the photodetector 50. The signals generated by the photodetector are received by the microprocessor in the circuit board, such that when the photodetector provides no light reading signal, indicating that the phase of the shutter is in a closed position, the error signal reflected to the sensor is strobed into memory to be used as a subtraction factor during a later measurement. When the photodetector provides a signal due to a light reflection from the LED light source, indicating the shutter is in an open position, the reading from the target is strobed into memory for processing. Also, if the shutter does not move to the next sequential position when the stepper motor is pulsed, the failure of the phase sensor to indicate a change in the phase will initiate another pulsing of the stepper motor, in an attempt to correct any problems which may occur in the jamming of the optical chopper mechanism due to jarring, foreign matter or the like.

Figure 5:
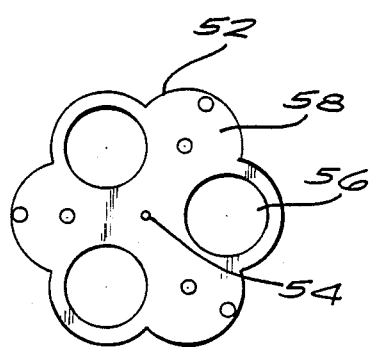
FIG. 5 is a top plan view of an alternative shutter.

An alternative configuration of the shutter is shown in FIG. 5. The rosette shaped shutter 52 is so configured to reduce the mass of the shutter to a minimum, for reduction of the power requirements of the stepper motor. The light transmitting portions 56 and the light reflecting portions 58 are arranged symmetrically and equally spaced about the center of rotation 54 of the shutter. On the opposite side of the light reflective portion of the shutter 58 are light absorptive portions, designed to absorb any stray reflections of infrared radiation from the components of the housing or insulation or other materials within the field of view of the detector which may contribute to an erroneous reading of the infrared thermometer. Of course, other shapes for the shutter itself and for appropriate positioning of light transmitting and light reflecting portions of such a shutter are possible, and other light weight reflective materials other than those described herein may also be appropriate.

In the foregoing description it has been demonstrated that the optical chopper of the infrared thermometer of the invention allows for the accurate automatic calibration of the infrared thermometer to account for internal error signals generated by elements in the infrared thermometer between the shutter and the infrared sensor. It is significant that the automatic strobing of the readings of the internal error signals and the signals from the target permit accurate and rapid measurements of infrared radiation for a determination of temperature. These features are particularly useful for taking readings of body temperatures of patients in a clinical setting.

Although one specific embodiment of the invention has been described and illustrated, it is clear that it is susceptible to numerous modifications and embodiments within the ability of those skilled in the art and without the exercise of the inventive faculty. Thus, it should be understood that various changes in form, detail and application of the present invention may be made without departing from the spirit and scope of this invention.

I claim:

1. In an infrared thermometer apparatus of the type having an infrared sensor and means in said thermometer for focusing infrared radiation on said sensor, the improvement in said thermometer of an optical chopper comprising:
   (a) a planar shutter having an axis of rotation, mounted for rotational movement through a plurality of stop positions adjacent and external to said means for focusing, having a first side facing said means for focusing and a second side, said shutter having equally spaced apart infrared radiation transmissive and non-transmissive portions, said non-transmissive portions of said first side having a reflective surface on at least a portion thereof; and
   (b) means for rotating said shutter sequentially through said plurality of stop positions corresponding to each of said transmissive and non-transmissive portions, such that each stop position is sequentially aligned with said means for focusing for either transmitting infrared radiation through said shutter or blocking transmission of substantially all external infrared radiation to said sensors and reflecting substantially all internal infrared radiation from said shutter to said sensor.

2. The apparatus of claim 1, wherein said shutter second side has a reflective surface.

3. The apparatus of claim 1, wherein said shutter has an odd number of said infrared radiation transmissive portions, and an equal number of corresponding infrared radiation reflective surfaces directly across said center of rotation from said transmissive portions.

4. The apparatus of claim 1, wherein said transmissive and reflective portions are disposed symmetrically on said shutter.

5. The apparatus of claim 1, wherein there are three transmissive portions and three reflective portions on said shutter.

6. The apparatus of claim 1, wherein said shutter is in the shape of a round wheel.

7. The apparatus of claim 1, wherein said shutter is in the shape of a rosette.

8. The apparatus of claim 1, wherein said means for rotating said shutter includes a shaft operatively connected to said shutter, and a stepper motor operatively connected to said shaft for rotating said shutter in response to a control signal.

9. The apparatus of claim 8, further comprising means operatively connected to said stepper motor for controlling said stepper motor, and adapted to generate said control signal.

10. The apparatus of claim 9, further including a power source connected to supply power to said stepper motor.

11. The apparatus of claim 9, further comprising means for sensing the positioning of said shutter in an infrared radiation transmissive phase or an infrared radiation reflective phase connected to said means for controlling said stepper motor.

12. The apparatus of claim 11, wherein said means for sensing said phases comprises a light source directed toward said shutter first side and a photodetector directed toward said shutter first side adapted to receive light reflected from said first side.

13. An infrared thermometer apparatus having an infrared sensor, means for focusing infrared radiation on said sensor, and an optical chopper comprising:
   (a) a planar shutter having an axis of rotation, mounted for rotational movement through a plurality of stop positions adjacent and external to said means for focusing, having a first side facing said means for focusing and a second side, said shutter having equally spaced apart infrared radiation transmissive and non-transmissive portions, said non-transmissive portions of said first side having a reflective surface on at least a portion thereof; and
   (b) means for rotating said shutter sequentially through said plurality of stop positions corresponding to each of said transmissive and non-transmissive portions, such that each stop position is sequentially aligned with said means for focusing for either transmitting infrared radiation through said shutter or blocking transmission of substantially all external infrared radiation to said sensor and reflecting substantially all internal infrared radiation from said shutter to said sensor.

14. The apparatus of claim 13, wherein said shutter second side has a reflective surface.

15. The apparatus of claim 13, wherein said shutter has an odd number of said infrared radiation transmissive portions, and an equal number of corresponding infrared radiation reflective surfaces directly across said center of rotation from said transmissive portions.

16. The apparatus of claim 13, wherein said transmissive and reflective portions are disposed symmetrically on said shutter.

17. The apparatus of claim 13, wherein there are three transmissive portions and three reflective portions on said shutter.

18. The apparatus of claim 13, wherein said shutter is in the shape of a round wheel.

19. The apparatus of claim 13, wherein said shutter is in the shape of a rosette.

20. The apparatus of claim 13, wherein said means for rotating said shutter includes a shaft operatively connected to said shutter, and a stepper motor operatively connected to said shaft for rotating said shutter in response to a control signal.

21. The apparatus of claim 20, further comprising means operatively connected to said stepper motor for controlling said stepper motor, and adapted to generate said control signal.

22. The apparatus of claim 21, further including a power source connected to supply power to said stepper motor.

23. The apparatus of claim 21, further comprising means for sensing the positioning of said shutter in an infrared radiation transmissive phase or an infrared radiation reflective phase connected to said means for controlling said stepper motor.

24. The apparatus of claim 23, wherein said means for sensing said phases comprises a light source directed toward said shutter first side and a photodetector directed toward said shutter first side adpated to receive light reflected from said first side.

25. An infrared thermometer apparatus comprising a housing, insulating means contained in said housing; heat sink means contained within said insulating means and surrounding an infrared sensor adapted to generate a signal indicative of infrared radiation received by said sensor; said sensor including means for measuring the temperature of said infrared sensor, means for focusing infrared radiation on said sensor; optical chopper means for controlling transmission of infrared radiation through said focusing means; and means for displaying a temperature reading operatively connected to receive said sensor signal; comprising:
   (a) a planar shutter having an axis of rotation, mounted for rotational movement through a plurality of stop positions adjacent and external to said means for focusing, having a first side facing said means for focusing and a second side, said shutter having equally spaced apart infrared radiation transmissive and non-transmissive portions, said non-transmissive portions of said first side having a reflective surface on at least a portion thereof; and
   (b) means for rotating said shutter sequentially through said plurality of stop positions corresponding to each of said transmissive and non-transmissive portions, such that each stop position is sequentially aligned with said means for focusing for either transmitting infrared radiation through said shutter or blocking transmission of substantially all external radiation from said sensor and reflecting substantially all internal infrared radiation from said shutter to said sensor.

26. The apparatus of claim 25, wherein said display means includes means for processing said signal from said sensor by determining and storing an error value proportional to temperature based on infrared radiation reflected to said sensor from said shutter; determining and storing a measured value proportional to temperature of a target based on infrared radiation transmitted to said sensor through said shutter, and subtracting said error value from said measured value to determine a corrected temperature measurement value, and means for displaying said corrected temperature measurement value.

27. The apparatus of claim 25, wherein said display means provides an alphanumeric display of said temperature reading.

28. The apparatus of claim 25, wherein said shutter second side has a reflective surface.

29. The apparatus of claim 25, wherein said shutter has an odd number of said infrared radiation transmissive portions, and an equal number of corresponding infrared radiation reflective surfaces directly across said center of rotation from said transmissive portions.

30. The apparatus of claim 25, wherein said transmissive and reflective portions are disposed symmetrically on said shutter.

31. The apparatus of claim 25, wherein there are three transmissive portions and three reflective portions on said shutter.

32. The apparatus of claim 25, wherein said shutter is in the shape of a round wheel.

33. The apparatus of claim 25, wherein said shutter is in the shape of a rosette.

34. The apparatus of claim 25, wherein said means for rotating said shutter includes a shaft operatively connected to said shutter, and a stepper motor operatively connected to said shaft for rotating said shutter in response to a control signal.

35. The apparatus of claim 34, further comprising means operatively connected to said stepper motor for controlling said stepper motor, and adapted to generate said control signal.

36. The apparatus of claim 35, further including a power source connected to supply power to said stepper motor.

37. The apparatus of claim 35, further comprising means for sensing the positioning of said shutter in an infrared radiation transmissive phase or an infrared radiation reflective phase connected to said means for controlling said stepper motor.

38. The apparatus of claim 37, wherein said means for sensing said phases comprises a light source directed toward said shutter first side and a photodetector directed toward said shutter first side adpated to receive light reflected from said first side.

* * * * *